E. A. JONES.
CANE STRIPPER.
APPLICATION FILED NOV. 26, 1909.
946,604.
Patented Jan. 18, 1910.
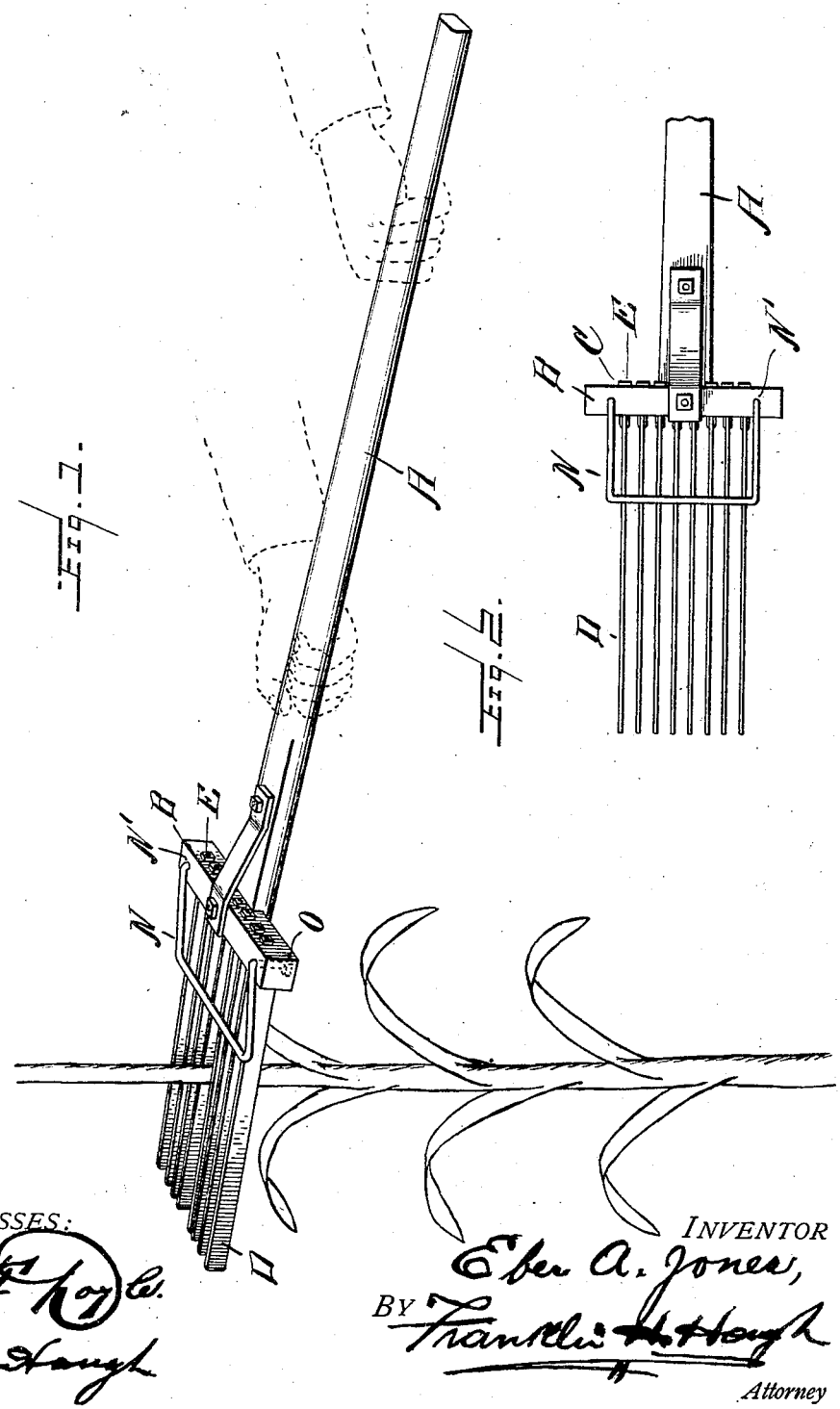

UNITED STATES PATENT OFFICE.

EBER ATKINS JONES, OF STILLWATER, OKLAHOMA.

CANE-STRIPPER.

946,604.

Specification of Letters Patent.　　Patented Jan. 18, 1910.

Application filed November 26, 1909. Serial No. 530,052.

*To all whom it may concern:*

Be it known that I, EBER ATKINS JONES, a citizen of the United States, residing at Stillwater, in the county of Payne and State of Oklahoma, have invented certain new and useful Improvements in Cane-Strippers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in cane strippers and comprises a simple and efficient device of this nature adapted at a single stroke to strip the blades of a stalk.

The invention comprises various details of construction, combinations and arrangements of parts which will be hereinafter fully described and then specifically defined in the appended claim.

I illustrate my invention in the accompanying drawings, in which:—

Figure 1 is a view showing the application of the invention, and Fig. 2 is a plan view of the device.

Reference now being had to the details of the drawings by letter, A designates a handle having a cross-piece B fastened to the front end thereof, which handle is provided with a series of apertures C for the reception of the butt ends of the stripper blades D, the portions of said butts which project through said apertures being threaded and adapted to receive the nuts E. The portions of said blades adjacent to the inner end of the butt portion have shoulders which bear against the face of the cross-piece opposite the one engaged by said nuts whereby, as the nuts are tightened, the blades are securely held in clamped relation to the cross-piece. Said blades which are preferably of rectangular shape in cross section are spaced apart a suitable distance to receive the stalks of cane and are made preferably of resilient material so that they will yield readily.

N designates a resilient bail-shaped wire, the ends of which are angled as at N' and pass through apertures in the cross-piece and nuts O engage the threaded ends of said bail which project through said apertures and serve as means for securely holding the bail in the position shown in the drawings. The cross-piece of said bail is positioned preferably about three inches from the forward edge of the cross-piece to which it is attached and serves two purposes, namely acting as a brace to the stripper blades and secondly as a guard to prevent the cane stalks from coming in contact with the cross bar which might have a tendency to cause the stalks to become wedged between the blades and the bar.

In operation, one long stroke from top to bottom of the stalk is made, the stalk entering one of the spaces intermediate two of the stripper blades, thus causing the leaves of the stalk to be severed therefrom and, as the edges of the stripper blades are blunt, the leaves are broken rather than cut by sharp edge from the stalk. The stripper blades being made of resilient material will adjust themselves at once to the size of the stalk being operated upon. In the event of the stripper being moved rapidly downward and at the proper angle to the leaf, the stalk may be completely stripped at one stroke of the device. The resilient bail-shaped member passing at right angles across the stripper blades would have a tendency, as stated, to reinforce and brace the same and prevent the stalk from becoming wedged between the blades.

What I claim to be new is:—

A cane stripper comprising a handle, a cross-piece fastened thereto and provided with a series of apertures, stripper blades having butt ends extending through said apertures and threaded, nuts fitted to the projecting threaded butt ends of the blades, a bail-shaped member having angled ends passing through apertures in said cross-piece and threaded, nuts mounted upon said angled threaded ends, said bail-shaped member being resilient and positioned crosswise of and adjacent to said blades.

In testimony whereof I hereunto affix my signature in the presence of two witnesses.

EBER ATKINS JONES.

Witnesses:
　MARY NOEL,
　F. C. LINCOLN.